United States Patent [19]

Fu et al.

[11] E Patent Number: Re. 32,786

[45] Reissued Date of Patent: Nov. 22, 1988

[54] NEUTRAL HYDROCARBOXYCARBONYL THIOUREA SULFIDE COLLECTORS

[75] Inventors: Yun-Lung Fu, Milford; Samuel S. Wang, Cheshire, both of Conn.

[73] Assignee: American Cyanamid Company, Stamford, Conn.

[21] Appl. No.: 79,628

[22] Filed: Jul. 30, 1987

Related U.S. Patent Documents

Reissue of:

[64] Patent No.: 4,556,483
Issued: Dec. 3, 1985
Appl. No.: 641,660
Filed: Aug. 17, 1984

[51] Int. Cl.[4] ..... B03D 1/14

[52] U.S. Cl. ..... 209/166; 252/61; 75/2; 560/148

[58] Field of Search ..... 209/166, 167; 75/1 R, 75/2; 252/61; 560/148

[56] References Cited

U.S. PATENT DOCUMENTS

| | | | |
|---|---|---|---|
| 3,780,089 | 12/1973 | Blecher et al. | 560/16 |
| 3,959,331 | 5/1976 | Fuchs et al. | 560/148 |
| 4,005,217 | 1/1977 | Berg et al. | 560/16 |
| 4,341,626 | 7/1982 | Dauplaise et al. | 209/166 |
| 4,387,034 | 6/1983 | Unger et al. | 209/166 |

FOREIGN PATENT DOCUMENTS

| | | | |
|---|---|---|---|
| 278855 | 2/1970 | Austria | 560/16 |
| 2617339 | 11/1976 | Fed. Rep. of Germany . | |
| 643197 | 1/1979 | U.S.S.R. | 209/166 |

OTHER PUBLICATIONS

CA 74(15) 76202r.
CA 80(13) 70756b.
CA 71(13) 60989e.

*Primary Examiner*—Bernard Nozick
*Attorney, Agent, or Firm*—Frank M. Van Riet

[57] ABSTRACT

New and improved collector compositions for use in froth flotation processes for the beneficiation of mineral values from base metal sulfide ores are disclosed. The collector compositions comprise at least one hydrocarboxycarbonyl thiourea compound selected from compounds of the formula:

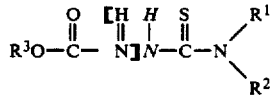

wherein $R^1$ is hydrogen or $R^2$; $R^2$ is selected from saturated and unsaturated hydrocarbyl radicals, hydrocarboxy radicals and aromatic radicals; and $R^3$ is selected from saturated and unsaturated hydrocarbyl radicals, alkyl polyether radicals and aromatic radicals, said $R^2$ and $R^3$ radicals, optionally, and independently, being substituted by polar groups selected from halogen, nitrile and nitro groups. The use of the hydrocarboxycarbonyl thiourea collectors provides excellent metallurgical recoveries of sulfide mineral values in froth flotation processes conducted over a very broad range of pH including acid, neutral and mildly alkaline pH.

15 Claims, No Drawings

NEUTRAL HYDROCARBOXYCARBONYL THIOUREA SULFIDE COLLECTORS

Matter enclosed in heavy brackets [ ] appears in the original patent but forms no part of this reissue specification; matter printed in italics indicates the additions made by reissue.

CROSS-REFERENCE TO RELATED APPLICATION

This application is a *a reissue application of our original patent No. 4,556,483, dated December 3, 1985, Serial No. 641,660 filed Aug. 17, 1984 which* is related to commonly-assigned, concurrently filed U.S. application, Ser. No. 641,659, filed Aug. 17, 1984, of D. R. Nagaraj entitled PROCESS FOR THE FLOTATION OF SULFIDE MINERALS IN ACID, NEUTRAL OR MILDLY ALKALINE CIRCUITS.

BACKGROUND OF THE INVENTION

The present invention relates to froth flotation processes for recovery of metal values from base metal sulfide ores. More particularly, it relates to new and improved sulfide collectors comprising certain hydrocarboxycarbonyl thiourea compounds which exhibit excellent metallurgical performance over a broad range of pH values.

Froth flotation is one of the most widely used processes for beneficiating ores containing valuable minerals. It is especially used for separating finely ground valuable minerals from their associated gangue or for separating valuable minerals from one another. The process is based on the affinity of suitably prepared mineral surfaces for air bubbles. In froth flotation, a froth or a foam is formed by introducing air into an agitated pulp of the finely ground ore in water containing a frothing or foaming agent. A chief advantage of separation by froth flotation is that it is a relatively efficient operation at a substantially lower cost than many other processes.

Current theory and practice state that the success of a sulfide flotation process depends to a great degree on the reagent(s) called collector(s) that impart(s) selective hydrophobicity to the value sulfide mineral that has to be separated from other minerals. Thus, the flotation separation of one mineral species from another depends upon the relative wettability of mineral surfaces by water. Typically the surface free energy is purportedly lowered by the adsorption of heteropolar collectors. The hydrophobic coating thus provided acts in this explanation as a bridge so that the mineral particles may be attached to an air bubble. The practice of this invention is not, however, limited by this or other theories of flotation.

In addition to the collector, several other reagents are also necessary. Among these, the frothing agents are used to provide a stable flotation froth, persistent enough to facilitate the mineral separation, but not so persistent that it cannot be broken down to allow subsequent processing. The most commonly used frothing agents are pine oil, creosote and cresylic acid and alcohols such as 4-methyl-2-pentanol, polypropylene glycols and ethers, etc.

Moreover, certain other important reagents, such as the modifiers, are also largely responsible for the success of flotation separation of sulfide minerals. Modifiers include all reagents whose principal function is neither collecting or frothing, but one of modifying the surface of a mineral so that a collector either adsorbs to it or does not. Modifying agents can thus be considered as depressants, activators, pH regulators, dispersants, deactivators, etc. Often, a modifier may perform several functions simultaneously. Current theory and practice of sulfide flotation again state that effectiveness of all classes of flotation agents depends to a large extent on the degree of alkalinity or acidity of the ore pulp. As a result, modifiers that regulate the pH are of great importance. The most commonly used pH regulators are lime, soda ash and, to a lesser extent, caustic soda. In sulfide flotation, however, lime is by far the most extensively used. In copper sulfide flotation, which dominates the sulfide flotation industry, for example, lime is used to maintain pH values over 10.5 and more usually above 11.0 and often as high as 12 or 12.5. In prior art sulfide flotation processes, pre-adjustment of the pH of the pulp slurry to 11.0 and above is necessary, not only to depress the notorious gangue sulfide minerals of iron, such as pyrite and pyrrhotite or other gangue minerals, but also to improve the performance of a majority of the conventional sulfide collectors, such as xanthates, dithiophosphates, trithiocarbonates and thionocarbamates. The costs associated with adding lime are becoming quite high and plant operators are interested in flotation processes which require little or no lime addition, i.e., flotation processes which are effectively conducted at a slightly alkaline, neutral or even at acid pH values. Neutral and acid circuit flotation processes are particularly desired because pulp slurries may be easily acidified by the addition of sulfuric acid, and sulfuric acid is obtained in many plants as a by-product of the smelters. Therefore, flotation processes which do not require preadjustment of pH or which provide for pH preadjustment to neutral or acid pH value using less expensive sulfuric acid are preferable to current flotation processes because current processes require pH preadjustment to highly alkalin values of at least about 11.0 using lime which is more costly.

To better illustrate the current problems, in 1980, the amount of lime used by the U.S. copper and molybdenum mining industry was close to 550 million pounds. For this industry, lime accounted for almost 92.5% by weight of the total quantity of reagent used, and the dollar value of the lime used was about 51.4% of the total reagent costs, which amounted to over 28 million dollars.

As has been mentioned above, lime consumption in individual plants may vary anywhere from about one lb. of lime/metric ton of ore processed up to as high as 20 lbs. of lime/metric ton of ore. In certain geographical locations, such as South America, lime is a scarce commodity and the costs of transporting and/or importing lime have risen considerably in recent years. Still another problem with prior art highly alkaline processes is that the addition of large quantities of lime to achieve sufficiently high pH causes scale formation on plant and flotation equipment, thereby necessitating frequent and costly plant shutdown for cleaning.

It is apparent, therefore, that there is a strong desire or reduce or eliminate the need for adding lime to sulfide flotation processes to provide substantial savings in reagents costs. In addition, reducing or eliminating lime in sulfide ore processing may provide other advantages by facilitating the operation and practice of unit operations other than flotation, such as slurry handling.

In the past, xanthates and dithiophosphates have been employed as sulfide collectors in froth flotation of base metal sulfide ores. A major problem with these conventional sulfide collectors is that at pH's below 11.0, poor rejection of pyrite or pyrrhotite is obtained. In addition, with decreasing pH the collecting power of these sulfide collectors also decreases, rendering them unsuitable for flotation in a mildly alkaline, neutral or acid environment. This decrease in collecting power with decreasing pH, e.g., below about 11.0, requires that the collector dosage be increased many fold, rendering it generally economically unattractive. There are many factors which may account for the lowering of collector activity with decreasing pH. A collector may interact differently with different sulfide minerals at a given pH. On the other hand, poor solution stability at low pH, such as that exhibited by xanthates and trithiocarbonates may very well explain the observed weak collector behavior.

Efforts to overcome the above deficiencies led to the development of neutral derivatives of xanthates such as alkyl xanthogen alkyl formates generally illustrated by the formula:

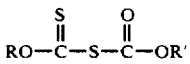

The alkyl xanthoegen alkyl formates are disclosed as sulfide collectors in U.S. Pat. No. 2,412,500. Other structural modifications of the general structure were disclosed later. In U.S. Pat. No. 2,608,572 for example, the alkyl formate substituents contain unsaturated groups. In U.S. Pat. No. 2,608,573, the alkyl formate substituents described contain halogen, nitrile and nitro groups. Bis alkyl xanthogen formates are described as sulfide collectors in U.S. Pat. No. 2,602,814. These modified structures have not found as much commercial application as the unaltered structures. For example, an alkyl xanthogen alkyl formate is currently commerically available under the trade name MINEREC A from the Mineric Corporation. MINEREC A, an ethyl xanthogen ethyl formate, as well as its higher homologs, still leave a lot to be desired at pH below 11.0 in terms of collecting power and pyrite rejection, as is more particularly described hereinafter.

Another class of sulfide collectors which have obtained some degree of commerical success in froth flotation are oily sulfide collectors comprising dialkylthionocarbamate or diurethane compounds having the general formula:

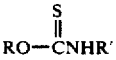

Several disadvantages are associated with the preparation and use of these compounds. In U.S. Pat. No. 2,691,635, a process for making dialkylthionocarbamates is disclosed. The three steps of the reaction sequence described are cumbersome and the final by-product is methyl mercaptan, an air pollutant which is costly to treat. In U.S. Pat. No. 3,907,854 an improved process for making dialkylthionocarbamate is described. Although good yields and high purity are claimed as the novel features of the process, it is noteworthy that a side product of the reaction is sodium hydrosulfide, also a pollutant which requires special treatment for disposal. In U.S. Pat. No. 3,590,998 a thionocarbamate sulfide collector structure in which the N-alkyl substitutent is joined by alkoxycarbonyl groups is disclosed. The preparation process described therein requires the use of expensive amino acid esters for the displacement reaction of the thio ester of xanthates. The by-products of this process are either methyl mercaptan or sodium thioglycolate. In addition, this type of structurally modified thionocarbamate has enjoyed very little commerical success. As will become apparent from the disclosure of this invention below, dialkylthionocarbamates are weak collectors as the pH drops below certain values.

Accordingly, it is an object of the present invention to provide a new and improved sulfide collector and flotation process for the beneficiation of sulfide minerals employing froth flotation methods which does not require any pre-adjustment of pH to highly alkaline values.

It is another object of the present invention to provide a new and improved sulfide collector and froth flotation process for the beneficiation of sulfide materials which provides selective recovery of sulfide metal values with selective rejection of pyrite and other gangue sulfides or non-sulfides.

It is a further object of the present invention to provide a new and improved sulfide collector and flotation process for the beneficiation of sulfide minerals using froth flotation methods which employs a novel class of sulfide collector reagents which may be prepared and used without the formation of harmful by-products or environmental pollutants.

It is another object of the present invention to provide a flotation process for the beneficiation of sulfide ores at pH values of 10.0 or below using certain novel collectors containing novel donor atom combinations designed specifically for low pH flotation.

It is still another object of the present invention to provide a new and improved process for selective flotation of value sulfides in acid circuits, wherein inexpensive sulfuric acid is used to control the pH.

SUMMARY OF THE INVENTION

In accordance with these and other objects, the present invention, in one embodiment, provides a new and improved collector composition for beneficiating an ore containing sulfide minerals with selective rejection of pyrite, and other gangue sulfides or non-sulfides, said collector composition comprising at least one hydrocarboxycarbonyl thiourea compound selected from compounds having the formula:

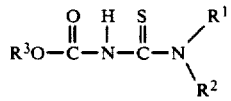

wherein $R^1$ is hydrogen or $R^2$; $R^2$ is selected from saturated and unsaturated hydrocarbyl radicals, hydrocarboxy radicals and aromatic radicals; and $R^3$ is selected from saturated and unsaturated hydrocarbyl radicals, alkyl polyether radicals and aromatic radicals, and $R^2$ and $R^3$ radicals optionally, and independently, being substituted with polar groups selected from halogen, nitrile and nitro groups. Particularly preferred hydrocarboxycarbonyl thiourea sulfide collectors for use in the process of the present invention comprises compounds of the formula wherein $R^1$ is hydrogen or $C_1$–$C_6$ alkyl; $R^2$ is $C_1$–$C_8$ alkyl, allyl, alkaryl or aryl; and $R^3$ is $C_1$–$C_6$ alkyl or aryl.

Generally, and without limitation, the new and improved hydrocarboxycarbonyl thionourea collectors of this invention may be used in amounts of from about 0.005 to 0.5 pounds per ton of ore, and preferably from about 0.01 to 0.3 pounds per ton of ore, to effectively selectively recover metal and mineral values from base metal sulfide ores while selectively rejecting pyrite and other gangue sulfide or nonsulfides. The new and improved sulfide collectors of this invention may generally be employed independently of the pH of the pulp slurries. Again, without limitation, these collectors may be employed at pH values of from about 3.5 to 11.0, and preferably from about 4.0 to 10.0.

In accordance with another embodiment, the present invention provides a new and improved process for beneficiating an ore containing sulfide minerals with selective rejection of pyrite and other gangue sulfides or non-sulfides, said process comprising: grinding said ore to provide particles of flotation size, slurrying said particles in an aqueous medium, conditioning said slurry with effective amounts of a frothing agent and a metal collector, and frothing the desired sulfide materials preferentially over pyrite and other gangue sulfides or non-sulfides by froth flotation procedures, said metal collector comprising at least one hydrocarboxycarbonyl thiourea compound selected from compounds having the formula given above.

In particularly preferred embodiments, a new and improved method for enhancing the recovery of copper from an ore containing a variety of copper sulfide minerals is provided wherein the flotation process is performed at a controlled pH of less than or equal to 10,0, and the collector is added to the flotation cell.

The present invention therefore provides a new class of sulfide collectors and a new and improved process for froth flotation of base metal sulfide ores. The hydrocarboxycarbonyl thiourea collectors and the process of the present invention unexpectedly provide superior metallurgical recovery in froth flotation separations as compared with conventional sulfide collectors, even at reduced collector dosages, and are effective under conditions of acid, neutral or mildy alkaline pH. In accordance with the present invention, a sulfide ore froth flotation process is provided which simultaneously provides for superior beneficiation of sulfide mineral values with considerable savings in lime consumption.

Other objects and advantages of the present invention will become apparent from the following detailed description and illustrative working examples.

DETAILED DESCRIPTION OF THE INVENTION

In accordance with the present invention, sulfide metal and mineral values are recovered by froth flotation methods in the presence of a novel sulfide collector, said collector comprising at least one hydrocarboxycarbonyl thiourea compound of the formula:

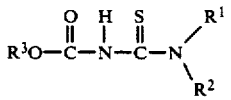

wherein $R^1$ is hydrogen or $R^2$; $R^2$ is selected from saturated and unsaturated hydrocarboxyl radicals, hydrocarboxy radicals and aromatic radicals; and $R^3$ is selected from saturated and unsaturated hydrocarbyl radicals, alkyl polyether radicals and aromatic radicals, and $R^2$ and $R^3$ radicals, optionally, and independently, being substituted by polar groups selected from halogen, nitrile and nitro groups. By hydrocarbyl is meant a radical comprised of hydrogen and carbon atoms which includes straight or branched, saturated or unsaturated, cyclic or acyclic hydrocarbon radicals. The $R^2$ and $R^3$ radicals may be unsubstituted or optionally substituted by polar groups such as halogen, nitrile or nitro groups. In addition, $R^2$ and $R^3$ may independently be selected from alkyl polyether radicals of the formula:

$$R^4(OY)_n-$$

wherein $R^4$ is $C_1$ to $C_6$ alkyl; Y is an ethylene or propylene group and n is an integer of from 1 to 4 inclusive. $R^2$ and $R^3$ may also independently be selected from aromatic radicals such as benzyl, phenyl, cresyl and xylenyl radicals, and aralkyl or alkaryl radicals or any of these aromatic radicals optionally substituted by the above-mentioned polar groups.

In preferred embodiments of applicants' process, the hydrocarboxycarbonyl thiourea collectors of the above formula employed are those compounds wherein $R^1$ is hydrogen, $R^2$ is selected from $C_1$–$C_8$ alkyl radicals, for example methyl, ethyl, n-propyl, isopropyl, n-butyl, sec-butyl, isobutyl, n-amyl, isoamyl, n-hexyl, isohexyl, heptyl, n-octyl and 2-ethylhexyl, or aryl radicals, e.g., phenyl tolyl and xylyl; and $R^3$ is selected from $C_1$–$C_6$ alkyl or aryl.

Illustrative compounds with the above formula for use as sulfide collectors in accordance with the present invention include:

N-ethoxycarbonyl-N'-isopropyl thiourea;
N-ethoxycarbonyl-N'-isobutyl thiourea;
N-ethoxycarbonyl-N',N'-methylisopropyl thiourea;
N-ethoxycarbonyl-N'-allyl thiourea;
N-propoxycarbonyl-N'-phenyl thiourea;
N-phenoxycarbonyl-N'-isopropyl thiourea;
N'-phenoxycarbonyl-N'-tolyl thiourea;
N'-phenoxycarbonyl-N'-allyl thiourea; and
N'-phenoxycarbonyl-N'-cyclohexyl thiourea,
to name but a few.

The hydrocarboxycarbonyl thiourea compounds for use in the flotation process of the present invention may be conveniently prepared, without forming polluting by-products, first, by reacting a corresponding chloroformate compound with ammonium, sodium or potassium thiocyanaate to form an isothiocyanate intermediate, in accordance with equation (1) as follows:

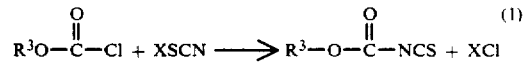

(1)

wherein $R^3$ is the same as defined above and X is $NH_4^+$, $Na^+$, or $K^+$.

Thereafter, the hydrocarboxycarbonyl isothiocyanate intermediate is reacted with an active amine compound in accordance with equation (2) as follows:

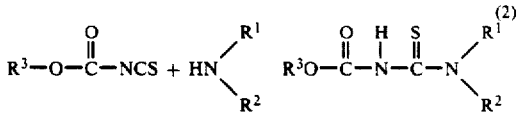

(2)

By active amine compound is meant any amine compound which will readily react with the isothiocyanate to form the corresponding thiourea. Illustrative active amine compounds include aliphatic amine, cyclic and acyclic, saturated and unsatured, unsubstituted or substituted by polar groups such as halogen, e.g., chloro, bromo or iodo, nitrile and nitro groups; aromatic amines such as aniline, toluidine, xylidine, benzylamine, alkoxy or aryloxy amines; ether amines and ethoxylated and/or propoxylated amines and anilines.

The corresponding chloroformates for reaction with the ammonium, sodium or potassium thiocyanate in accordance with equation (1) above, may themselves be prepared by reaction of the corresponding aliphatic or aromatic alcohols with phosgene, in accordance with equation (3) as follows:

$$R^3OH + Cl-\overset{\overset{\displaystyle O}{\|}}{C}-Cl \longrightarrow R^3O-\overset{\overset{\displaystyle O}{\|}}{C}-Cl + HCl \qquad (3)$$

wherein $R^3OH$ comprises an active hydroxyl compound. By active hydroxyl compound is meant any compound bearing an hydroxyl group which will readily react with phosgene to form the corresponding chloroformate material. Illustrative active hydroxy compounds include aliphatic alcohols, cyclic and acyclic saturated and unsaturated, unsubstituted or substituted by polar groups such as halogen, e.g. chloro, bromo or iodo, nitrile and nitro groups; aromatic alcohols such as phenol, xylenol; aryl alkanols such as benzyl alcohols; and ethoxylated and propoxylated alcohols.

By way of further illustration, chloroformates made from ethoxylated or propoxylated alcohols may be prepared in accordance with this method, e.g., $$R^5(OCH_2CH_2)_n-OH + Cl-\overset{\overset{\displaystyle O}{\|}}{C}-Cl \longrightarrow R^5(OCH_2CH_2)_n-O-\overset{\overset{\displaystyle O}{\|}}{C}-Cl + HCl \qquad (4)$$

wherein $R^5$ is $C_1$–$C_6$ alkyl and n is 1 to 4 inclusive; as well as, aromatic alcohols such as phenols, cresols and xylenols, e.g.,

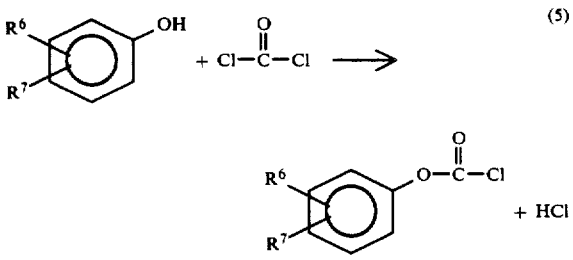

(5)

wherein $R^6$ is H or $CH_3$ and $R^7$ is H, $CH_3$, Cl, Br, I, $-NO_2$ or $-C{\equiv}N$.

Referring again to the preparation of the new and improved hydrocarboxycarbonyl thiourea sulfide collectors of the present invention shown in Equations (1) and (2) above, it is apparent that sodium chloride is the only innocuous side product in the reaction of equation (1). Moreover, in equation (2), the condensation of the isothiocyanate with the active amine compound is fast and complete and does not release any polluting by-product.

In accordance with the present invention, the above-described hydrocarboxycarbonyl thioureas are employed as sulfide collectors in a new and improved froth flotation process which provides a method for enhanced beneficiation of sulfide mineral values from base metal sulfide ores over a wide range of pH values and more particularly under acidic, neutral, slightly alkaline and highly alkaline conditions.

In accordance with the present invention, the new and improved, essentially pH-independent, process for the beneficiation of mineral values from base metal sulfide ores comprises, firstly, the step of size-reducing the ore to provide ore particles of flotation size. As is apparent to those skilled in this art, the particle size to which an ore must be size reduced in order to liberate mineral values from associated gangue or non-values, i.e., liberation size, will vary from ore to ore and many depend on several factors, such as, for example, the geometry of the material deposits within the ore, e.g., striations, agglomeration, comatrices, etc. In any event, as is common in this art, a determination that particles have been size reduced to liberation size may be made by microscopic examination. Generally, and without limitation, suitable particle size will vary from between about 50 mesh to about 400 mesh sizes. Preferably, the ore will be size-reduced to provide flotation sized particles of between about +65 mesh and about −200 mesh. Especially preferably for use in the present method are base metal sulfide ores which have been size-reduced to provide from about 14% to about 30% by weight of particles of +100 mesh and from about 45% to about 75% by weight of particles of −200 mesh sizes.

Size-reduction of the ores may be performed in accordance with any method known to those skilled in this art. For example, the ore can be crushed to −10 mesh size followed by wet grinding in a steel ball mill to specified mesh size or pebble milling may be used. The procedure employed in size-reducing the ore is not critical to the method of this invention, as long as particles of effective flotation size are provided. Preadjustment of pH is conveniently performed by addition of the modifier to the grind during the size reduction step.

The size-reduced ore, e.g., comprising particles of liberation size, is thereafter slurried in aqueous medium to provide a floatatable pulp. The aqueous slurry or pulp of flotation sized ore particles, typically in a flotation apparatus, is adjusted to provide a pulp slurry which contains from about 10 to 60% by weight of pulp solids, preferably 25 to 50% by weight and especially preferably from about 30% to about 40% by weight of pulp solids.

Thereafter the pH of the pulp slurry may be preadjusted to any desired value by the addition of either acid or base, and typically sulfuric acid or lime are used for this purpose, respectively. A distinct advantage of the present process is that the new and improved hydrocarboxycarbonyl thiourea sulfide collectors employed in the process of this invention do not require any preadjustment of pH and generally the flotation may be performed at the natural pH of the ore pulp, thereby simplifying the process, saving costs and reducing lime consumption and related plant shut-downs. Thus, for example, good benefication has been obtained in accordance with the process of the present invention at pH values ranging between 3.5 to 11.0, and especially good beneficiation has been observed with pH values within the range of from about 4.0 to about 10.0 pH.

In accordance with a preferred embodiment of the process of the present invention, the flotation of copper, zinc and lead sulfides is performed at a pH of less than or equal to 10.0 and preferably less than 10.0. It has been discovered that in conducting the flotation at this pH, the new and improved hydrocarboxycarbonyl thionocarbamate collectors of the present invention exhibit exceptionally, good collector strength, together with excellent collector selectivity, even at reduced collector dosages. Accordingly, in this preferred process, sulfuric acid is used to bring the pH of the pulp slurry to less than or equal to 10.0, if necessary.

In any event and for whatever reason, the pH of the pulp slurry may be pre-adjusted if desired at this time by any method known to those skilled in the art.

After the pulp slurry has been prepared, the slurry is conditioned by adding effective amounts of a frothing agent and a collector comprising at least one hydrocarboxycarbonyl thiourea compound as described above. By "effective amount" is meant any amount of the respective components which provides a desired level of beneficiation of the desired metal values.

More particularly, any known frothing agent may be employed in the process of the present invention. By way of illustration such floating agents as straight or branched chain low molecular weight hydrocarbon alcohols, such as $C_6$ to $C_8$ alkanols, 2-ethyl hexanol and 4-methyl-2-pentanol, also known as methyl isobutyl carbinol (MIBC) may be employed, as well as, pine oils, cresylic acid, polyglycol or monoethers of polyglycols and alcohol ethoxylates, to name but a new of the frothing agents which may be used as frothing agent(s) herein. Generally, and without limitation, the frothing agent(s) will be added in conventional amounts and amounts of from about 0.01 to about 0.2 pounds of frothing agent per ton of ore treated are suitable.

The new and improved hydrocarboxycarbonyl thiourea sulfide collectors for use in the process of the present invention may generally be added in amounts of from about 0.005 to about 0.5 pounds of collector per ton of ore and preferably will be added in amounts of from about 0.01 lbs. to about 0.3 lbs/ton of ore processed. In flotation wherein pyrite and other gangue sulfides are to be selectively depressed over copper sulfides, the amount of collectors employed will generally be between 0.01 lbs/ton to 0.05 lbs/ton.

Thereafter, in accordance with the process of the present invention, the conditioned slurry, containing an effective amount of frothing agent and an effective amount of collector comprising at least one hydrocarboxycarbonyl thiourea compounds, is subjected to a frothing step in accordance with conventional froth flotation methods to flotate the desired sulfide mineral values in the froth concentrate and selectively reject or depress pyrite.

It has also been surprisingly discovered that, contrary to the conventional belief that a neutral, oily collector is most effective when it is added to the grind instead of to the flotation cells, the new and improved hydrocarboxycarbonyl thiourea collectors of the present invention exhibit more efficient recovery when they are added to the flotation cell, as opposed to the grind. The novel collectors of this invention, although water-insoluble for all practical purposes, have the distinct advantage of being easily dispersible. The novel collectors when added to the flotation cell provide higher copper recovery in the first flotation together with improved copper recovery overall, indicating improved kinetics of flotation, to be more fully described hereinafter.

Other objects and advantages provided by the new and improved collectors and process of this invention will become apparent from the following working Examples, which are provided by way of further illustration only, to enable those skilled in this art to better understand and practice the present invention.

PREPARATION 1

Synthesis of Ethoxycarbonyl Isothiocyanate

A 2-liter three-necked round-bottomed flask fitted with a reflux condenser protected from the moisture by a drying tube containing anhydrous calcium sulfate, an addition funnel and a mechanical stirrer was mounted in a heating mantle. In the flask were placed 700 ml of dry acetonitrile and 194 grams of potassium thiocyanate. The mixture was heated, with stirring, to 70° C. and then the external heating was discontinued. To the mixture were added with stirring, 217 grams of ethyl chloroformate from the addition funnel in 40 minutes. An exothermic reaction set in. The mixture thickened and turned yellow. After the addition was completed, the temperature of the reaction mixture reached 77° C. The reaction mixture was stirred for 3 hours without any external hearing. Thereafter, the reaction mixture was cooled to room temperature and the precipitate was removed by filtration. The precipitate cake was washed with dry acetonitrile. The filtrate and the washing were combined and concentrated by evaporation under reduced pressure. The residual liquid was distilled through a fractioning column. There were obtained 86.9 grams of ethoxycarbonyl isothiocyanate, a colorless liquid which boiled at 45° C./11 mm Hg or 48° C./12 mm Hg.

PREPARATION 2

Synthesis of N-Ethoxycarbonyl-N'-Isopropyl Thiourea

A solution of 7.1 grams of isopropylamine in 40 ml of anhydrous ethyl ether was added dropwise in 30 minutes with stirring to a solution of 15.5 grams of ethoxycarbonyl isothiocyanate (Preparation 1) in 10 ml of anhydrous ethyl ether. The reaction vessel was cooled with an ice-water bath. The reaction mixture was let stand at an ambient room temperature. After the reaction was complete, the solution was concentrated by stripping off most of the solvent under reduced pressure. The crystals were collected by filtering and washing with hexanes. The first crop weighed 8.1 grams, m.p. 52.5°-54° C. The second crop weighed 7 grams, m.p. 52°-54° C.

PREPARATION 3

Synthesis of N-Ethoxycarbonyl-N'-Isobutyl Thiourea

A solution of 5.3 grams of ethoxycarbonyl isothiocyanate (Preparation 1) in 100 ml of petroleum ether (b.p. 35°-60° C.) was cooled with stirring in an ice-water bath. To the above solution was added dropwise in 20 minutes a solution of 3.9 grams of isobutylamine in 50 ml of petroleum ether. The reaction flask was cooled in the ice-water bath during the addition. After the addition was complete the reaction flask was removed from the ice-water bath and let stand at an ambient temperature overnight. The solution was concentrated by stripping off most of the solvent. The concentrated solution was cooled in a ice-water bath. The crystals were collected by filtering and washing with hexanes. The product weighed 7.5 grams and melted at 50°-52° C.

PREPARATION 4

Synthesis of A Liquid Product Containing N-Ethoxycarbonyl-N'-Isopropyl Thiourea and N-Ethoxycarbonyl-N'-Isobutyl Thiourea In a 250 ml round-bottomed flask were added 11.86 grams of n-octane and 11.86 grams of ethoxycarbonyl isothiocyanate (Preparation 1). The flask was immersed in an ice-water bath and the mixture was stirred for 5 minutes using a magnetic stirring bar. To the above solution was added dropwise from an addition funnel a solution of 2.63 grams of isopropylamine and 3.25 grams of isobutylamine in 3.57 grams of n-octane. The reaction flask was immersed in the ice-water bath and the reaction mixture was stirred during the addition of the amine solution. The reaction flask was then removed from the ice-water bath and the reaction mixture was stirred at ambient room temperature until the reaction was completed. The reaction solution was concentrated by stripping off the volatiles, which contained mostly n-octane, and yielded a liquid product weighing 18.34 grams. It contained N-ethoxycarbonyl-N'isopropyl thiourea and N-ethoxycarbonyl-N'-isobutyl thiourea in a molar ratio 1:1 and the solids content of these two thioureas was 87.4%.

The above synthesized hydrocarboxylcarbonyl thioureas were employed as collectors for a variety of sulfide ores and tested for beneficiation properties at a variety pH values and compared with prior art sulfide collector compounds. Other homologous and/or analogous hydrocarboxylcarbonyl thioureas may be employed in the following examples which are easily prepared according to substantially identical preparation methods, substituting the appropriate corresponding active amine compounds to provide the $R^1$ and $R^2$ groups desired.

In each of the following examples, the following general preparation and testing procedures were used:

The sulfide ores were crushed to −10 mesh sizes. An amount of the crushed ores of between about 500 to 2,000 grams was wet ground in a steel ball mill with a steel ball charge of 10.7 kg and at 63% solids for about 8 minutes or until a pulp having this size distribution indicated was obtained, generally about 10–20% +65 mesh, 14–30% +100 mesh and 40–80% −200 mesh. Lime and sulfuric acid were used as the pH modifiers to adjust the pH as required. The frother used was added to the grind in some tests and added to the flotation cell in others. In certain tests, 50% the collector was added to the grind, otherwise, the collector was added to the first and second stages of conditioning in the flotation cell.

The size reduced pulp, with or without frother and collector additives, was transferred to a Denver D12 rectangular flotation cell. The volume of the pulp was adjusted to 2650 ml by adding water to provide a pulp density of about 30–35% solids and a pulp level in the cell at about 2 cm below the lip.

Collector and/or frother were added to the pulp while agitating at about 1400 rpm. The pulp was conditioned for a period of two minutes and pH and temperature measurements were taken at that time. At the end of the two minutes conditioning, air was fed at about 7 liters/minute from a compressed air cylinder. The froth flotation was continued for about 3 minutes during which a first stage concentrate was collected. Thereafter the air was turned off and more collector and frother were added and the pulp was conditioned for an additional two minutes. After the second two minute conditioning step the air was turned on and a second stage concentrate was collected. The flotation times were predetermined to give a barren froth upon completion of flotation.

The first and second stage concentrates and tailings were filtered, dried, sampled and assayed for copper, iron and sulfur. Tap water at the required temperature was use in all tests. The abbreviation t is used to indicate a standard ton, e.g., 2000 lbs. and T represents a metric ton, e.g., 1000 kg. or 2204 lbs.

EXAMPLES 1-2

Acid Circuit Flotation

A South American copper-molybdenum ore with a copper head assay of 1.65% and pyrite head assay of 2.5% and 0.025% molybdenum was used in the following examples. The copper minerals present in the ore were chalcocite, chalcopyrite, covellite, bornite and some oxide copper minerals, such as malachite and cuprite. Although the ore contained a large amount of chalcopyrite, an appreciable amount of it was rimmed with chalcocite and covellite.

About 500 grams of a −10 mesh sample of this ore was wet ground for about 13 minutes in a steel ball mill containing a steel ball charge of 5.3 kg. and at a 63% solids content to yield a pulp with a size distribution of 14% +100 mesh and 62% −200 mesh. The ore pulp had a natural pH of 5.5 and sulfuric acid was used to adjust pulp pH to about 4.0 10.5 g/T of diesel oil were also added in each example. The collectors tested were added to the flotation cell in the first and second stages of conditioning. The flotation procedure outline above was used in each of the flotation tests.

The standard collector for this ore is a 60/30/10 blend of ethyl xanthogen ethyl formate/diesel fuel/-MIBC as well as 2.5 g/T of sodium diethyldithiophosphate. To provide additional comparisons, testing was also performed using the diethyl xanthogen formate in pure form as well as another standard collector, a dialkyl thionocarbamate. The standard collectors as well as the new and improved hydrocarboxycarbonyl thiourea collectors of this invention were subjected to first stage and second stage flotations. The grade and the percent copper recovered, percent pyrite recovery were measured by assaying the froth concentrates and tailings of each flotation stage. In addition, a selectivity/performance index was calculated for each of the collectors tests.

More particularly, the selectivity/performance index was defined and calculated in accordance with the following equation:

$$I_{cu} = \frac{(100 - \text{percent pyrite recovered})}{(100 - \text{percent copper recovered})^2}$$

The selectivity index for copper is a convenient method for measuring not only the copper recovery of a collector but also its selectivity for rejecting gangue sulfides such as a pyrite and pyrrhotite. For example, if for this particular ore, a 90% recovery for copper and an 92% recovery of pyrite were accepted as optimum, then the optimum selectivity index of a collector for copper using this ore would be 0.08. The collectors tested and the flotation results obtained are set forth in Table 1, as follows:

TABLE 1

ACID CIRCUIT FLOTATION
Head Assay: Cu = 1.65%. $FeS_2$ = 2.5%: pH = 4.0
Frother = polypropylene glycol monomethylether at 60 g/T:
Sulfuric Acid 5.0 kg/T to pH 4.0

| Example | Collector | Dosage g/T | % Cu Rec. | % Cu Grade | % $FeS_2$ Rec. | $I_{cu}$ |
|---|---|---|---|---|---|---|
| A. | Standard blend[a] | 10 | 46.7 | 4.5 | 21.1 | 0.028 |
| B. | " | 20 | 78.9 | 7.0 | 80.9 | 0.043 |
| C. | " | 30 | 89.6 | 7.2 | 91.5 | 0.078 |
| D. | " | 40 | 90.1 | 7.2 | 92.2 | 0.080 |
| E. | Sodium diethyl dithiophosphate | 20 | 65.1 | 6.2 | 45.4 | 0.045 |
| F. | Diethyl xanthogen formate | 15 | 88.5 | 8.8 | 88.2 | 0.09 |
| G. | Diethyl xanthogen formate | 20 | 90.6 | 8.4 | 93.4 | 0.075 |
| H. | Isopropyl ethyl thionocarbamate | 15 | 76.3 | 7.8 | 83.0 | 0.030 |
| 1. | N—Ethoxycarbonyl N'—isopropyl thiourea | 9.5 | 91.3 | 8.6 | 92.1 | 0.104 |
| 2. | N—Ethoxycarbonyl N'—isopropyl thiourea | 10.2 | 90.7 | 8.3 | 93.5 | 0.075 |

[a]60/30/10 blend of ethylxanthogen ethyl formate/diesel fuel/MIBC

It is apparent from the data contained in Table 1 that the novel hydrocarboxycarbonyl thiourea collectors of this invention shown in Examples 1 and 2 gave superior metallurgical results at a reduced dosage as compared with the conventionally used standard collector blend of Examples A–D and the sodium diethyldithiophosphate of Example E. In addition, the collectors of this invention, Examples 1 and 2 performed better than the pure diethyl xanthogen formate collector of Examples F and G as well as the isopropyl ethyl thionocarbamate of Example H. Table 1 demonstrates that higher copper recoveries are obtained with a hydrocarboxycarbonyl thiourea collector of this invention at reduced dosages. Only the novel collectors provided the required $I_{cu}$ values.

EXAMPLES 3–6

Mildly Alkaline pH Flotation

A Southwestern U.S. ore containing 0.867% copper and 7.0% pyrite head assay was used in these examples. The principal copper mineral was chalcopyrite although the ore also contained some chalcocite, covellite and bornite.

510 grams of ore were ground for 8.5 minutes at 65% solids in a steel ball mill to obtained a pulp with the size distribution of 5.8% +65 mesh, 19% +100 mesh and 53.3% of −200 mesh. Lime was used to adjust the pH of the pulp to the slightly alkaline values shown. The frothing agent employed was a 70/30 mixture of polypropylene glycol/polypropylene glycol monomethyl ether added at 91 g/T. To make the comparison more meaningful, collector dosage on an equimolar basis was used and reported as moles per metric ton. The standard collector for this ore is a sodium amyl xanthate which is known to give optimum performance at a pH of 11.5. The collectors were tested at various dosage and pH and the results are set forth in Table 2 as follows:

TABLE 2

MILDLY ALKALINE CIRCUIT FLOTATION
Head Cu = 0.867%. $FeS_2$ = 7.0%. Frother 91 g/T.
Collector dosages and pH given below

| Example | Collector | Lime kg/T | Dosage M/T | pH | % Cu Rec. | % Cu Grade | $FeS_2$ Rec. | $I_{cu}$ |
|---|---|---|---|---|---|---|---|---|
| I. | Sodium amyl xanthate | 0.35 | 0.124 | 9.0 | 78.9 | 16.5 | 23.2 | 0.172 |
| J. | " | 1.27 | 0.124 | 10.0 | 83.0 | — | 26.0 | 0.256 |
| K. | " | 3.92 | 0.124 | 11.50 | 88.6 | 8.5 | 33.9 | 0.506 |
| L. | " | | 0.062 | 10.0 | 80.5 | — | 22.0 | 0.205 |
| M. | " | | 0.062 | 11.50 | 89.4 | 9.3 | 29.0 | 0.638 |
| 3. | N—Ethoxycarbonyl N'—isopropyl thiourea | 0.35 | 0.124 | 9.0 | 89.1 | 8.4 | 46.1 | 0.455 |
| 4. | N—Ethoxycarbonyl N'—isopropyl thiourea | 1.27 | 0.062 | 10.0 | 89.3 | 10.7 | 25.3 | 0.651 |
| 5. | N—Ethoxycarbonyl N'—isobutyl thiourea | 0.35 | 0.124 | 9.0 | 89.6 | 9.6 | 37.1 | 0.584 |
| 6. | N—Ethoxycarbonyl N'—isobutyl thiourea | 1.27 | 0.062 | 10.0 | 88.1 | 9.8 | 21.4 | 0.553 |

The results of Table 2 demonstrate that the hydrocarboxycarbonyl thiourea collectors of the present invention provide equivalent metallurgy at pH 9.0 or 10.0 and at a lime consumption of only 10–30% as compared with the standard sodium amyl xanthate collector of Examples I–M. The data demonstrate that high copper recoveries and selectivity against pyrite are obtained at reduced lime consumption with the collectors of this invention shown in Examples 3–6. This is evident also from the high $I_{cu}$ obtained for these collectors. It is important to note that the standard collectors give very poor metallurgy at pH 9 and 10 as shown by the result in Examples I, J and L.

EXAMPLES 7–8

Mildly Alkaline pH Flotation

A South American copper-molybdenum ore containing 1.844% copper and 4.2% pyrite by head assay was used in the following examples. The copper minerals present were predominantly chalcocite, chalcopyrite, covellite and bornite.

510 grams of the ore was wet ground in a steel ball mill for 7.5 minutes at 68% solids to obtain a pulp with the size distribution of 24.7% +65 mesh, 38.3% +100 mesh and 44% −200 mesh. 2.5 g/T of di-sec-butyldithiophosphate was added to the grind in all of the tests. Lime was also added to the grind to obtain the required pH in flotation. The pulp was transferred to a flotation cell and conditioned at 1100 rpm and 32% solids. The frothing agent employed was a 1/1/1 mixture of polypropylene glycol monomethylether/MIBC/pine oil added at about 0.04 lb./T. The collectors of this invention were tested against a number of standard collectors and the results obtained are set forth in Table 3 as follows:

TABLE 3

MILDLY ALKALINE CIRCUIT FLOTATION
Head Cu = 1.844%. $FeS_2$ = 4.2%. Frother 20 g/T. pH 9.0.
Collector dosage = 0.125 mole/T.

| Example | Collector | mole/T | Lime Kg/T | pH | % Cu Rec. | % Cu Grade | % $FeS_2$ Rec. | $I_{cu}$ |
|---|---|---|---|---|---|---|---|---|
| N | Sodium Isopropyl xanthate (standard) | 0.125 | 0.53 | 10.5 | 84.4 | 11.8 | 86.2 | 0.057 |
| O | Sodium Isopropyl xanthate (standard) | 0.190 | 0.53 | 10.5 | 84.7 | 12.6 | 88.0 | 0.051 |
| P | Sodium Isopropyl xanthate (standard) | 0.190 | 0.24 | 9.0 | 79.3 | 16.0 | 83.1 | 0.04 |
| Q | Allyl amyl xanthate ester | 0.125 | 0.24 | 9.0 | 49.0 | 12.2 | 20.3 | 0.031 |
| R | Diisobutyl dithio phosphinate | 0.125 | 0.24 | 9.0 | 62.6 | 13.9 | 46.3 | 0.038 |
| 7 | N—Ethoxycarbonyl N'—isopropyl thiourea | 0.125 | 0.24 | 9.0 | 83.6 | 14.6 | 67.3 | 0.121 |
| 8 | N—Ethoxycarbonyl N'—isobutyl thiourea | 0.125 | 0.24 | 9.0 | 85.4 | 12.3 | 82.4 | 0.082 |

The data of Table 3 indicate that the novel hydrocarboxycarbonyl thioureas of this invention shown in Example 7-8 provided copper recoveries at a pH 9.0 that were essentially equivalent to those obtained with the sodium isopropyl xanthate standard collector shown in Examples N-O at a pH of 10.5. In fact, the standard collector gave poor copper recovery at pH 9.0 even at a dosage level of 0.19 moles/T as shown in Example P. The use of the novel hydrocarboxycarbonyl thiourea collectors shown in Examples 7 and 8 as compared with the standard control of Examples N-P demonstrate that lime consumption is reduced with the collectors of the present invention by over 50%. The collectors of Examples 7-8 gave satisfactory grade of copper in the concentrate and provided better selectivity against pyrite. It is to be noted that the other conventional collectors shown in Examples Q and R gave very poor copper recoveries as a pH of 9.0.

Mildy Alkaline pH Flotations

In the following examples, a Southwestern U.S. copper-molybdenum ore was used which had a head assay for copper of about 0.778% and for pyrite of about 5.7%. This ore was one of the most complicated of all the ores tested in terms of complex mineralogy, low overall copper recovery, high lime consumption and frothing problems. The ore contained predominantly chalcocite, however, the pyrite in the ore was excessively rimmed and disseminated with chalcocite and covellite. Pyrite separation in the rougher flotation or first stage was therefore not possible and was not attempted. 880 grams of the ore were conditioned with 500 g/T of ammonium sulfide and ground for 6 minutes in a steel ball mill at 55.5% solids to obtain a pulp with a size distribution of 17.4% +65 mesh, 33% +100 mesh and 47.4% −200 mesh. The pulp was conditioned at 1500 rpm at 20.4% solids.

The standard operating pH for this ore is 11.4-11.5 using as a standard collector N-ethyl-O-isopropyl thionocarbamate. The lime consumption required to provide an operating pH of 11.4-11.5 is about 3.07 kg/T. The standard frother used is cresylic acid at about 150 g/T.

The collectors were tested at the dosages and under the pH conditions indicated. The results are set forth in Table 4 as follows:

TABLE 4

MILDLY ALKALINE CIRCUIT FLOTATION
Head Cu = 0.778%. $FeS_2$ = 5.7%. Frother 150 g/T

| Example | Collector | mole/T | pH | Lime Kg/T | % Cu Rec. | % Cu Grade | % $FeS_2$ Rec. | $I_{cu}$ |
|---|---|---|---|---|---|---|---|---|
| S | N—ethyl O—isopropyl thionocarbamate | 0.210 | 8.0 | 0.23 | 68.6 | 8.3 | 73.5 | 0.027 |
| T | N—ethyl O—isopropyl thionocarbamate | 0.105 | 9.0 | 0.74 | 78.2 | 9.7 | 62.0 | 0.080 |
| U | N—ethyl O—isopropyl thionocarbamate | 0.210 | 10.3 | 1.59 | 81.6 | 10.1 | 64.4 | 0.105 |
| V | N—ethyl O—isopropyl thionocarbamate | 0.105 | 11.4 | 3.07 | 57.8 | 15.4 | 24.4 | 0.042 |
| W | N—ethyl O—isopropyl thionocarbamate | 0.210 | 11.4 | 3.07 | 81.0 | 11.6 | 54.8 | 0.126 |
| X | Sodium n-butyl trithiocarbonate | 0.105 | 8.0 | 0.23 | 26.3 | 7.6 | 24.1 | 0.014 |
| Y | " | 0.210 | 8.0 | 0.23 | 47.2 | 8.7 | 47.4 | 0.019 |
| Z | Allyl amyl xanthate ester | 0.105 | 9.0 | 0.70 | 46.7 | 12.0 | 30.6 | 0.024 |
| AA | " | 0.210 | 8.0 | 0.23 | 35.8 | 10.0 | 33.2 | 0.016 |
| BB | Sodium diisobutyl dithiophosphate | 0.210 | 8.0 | 0.23 | 60.1 | 9.8 | 51.5 | 0.030 |
| CC | Ammonium diisobutyl thiophosphinate | 0.105 | 9.0 | 0.70 | 57.6 | 11.3 | 33.9 | 0.037 |
| 9 | N—Ethoxycarbonyl N'—isopropyl thiourea | 0.210 | 8.0 | 0.25 | 78.0 | 8.2 | 84.0 | 0.033 |
| 10 | N—Ethoxycarbonyl N'—isopropyl thiourea | 0.105 | 9.0 | 0.70 | 77.7 | 10.5 | 60.1 | 0.080 |
| 11 | N—Ethoxycarbonyl N'—isopropyl thiourea | 0.105 | 9.7 | 1.14 | 78.8 | 10.0 | 66.8 | 0.074 |
| 12 | N—Ethoxycarbonyl N'—isobutyl thiourea | 0.210 | 8.0 | 0.25 | 81.5 | 7.8 | 88.3 | 0.034 |
| 13 | N—Ethoxycarbonyl N'—isobutyl thiourea | 0.105 | 9.0 | 0.70 | 81.2 | 9.3 | 66.3 | 0.095 |
| 14 | N—Ethoxycarbonyl N'—isobutyl thiourea | 0.105 | 10.0 | 1.36 | 79.2 | 9.7 | 62.3 | 0.087 |

The data of Table 4 demonstrate that hydrocarboxcarbonyl thioureas of the subject invention shown in Examples 9-14 at a pH of 8.0 or 9.0 provided copper recoveries that were essentially equivalent to those obtained with the standard collectors of Example U, V and W at a pH of 10.3 or 11.4. The copper grades were also comparable. The important results are that with the use of the novel collectors of this invention, the lime consumption can be reduced by more than 50-75% of the standard lime consumption. In fact, for the collector of this invention shown in Examples 12-14, the lime consumption at a pH of 8.0 and a dosage of 0.210 moles/T could be reduced by 92% and at a pH of 9.0 and a dosage of only 0.105 moles/T, it could be reduced by 78%. At a pH of 9.0, the selectively against pyrite is also acceptable and for this ore, higher pyrite recoveries are inevitable, as explained in the previous section. It is to be noted that with several of the other conventional collectors shown in Examples X–CC, very poor copper recoveries were obtained. It should also be noted that the standard collector of Examples S–W gave very poor metallurgy at pH's of 8.0 and 9.0.

The foregoing examples demonstrate the significant improvements and advantages achieved with the new and improved hydrocarboxycarbonyl thiourea collectors of this invention over a number of conventional collectors known to those skilled in the art.

Although the present process has been described with reference to certain preferred embodiments, modifications or changes may be made therein by those skilled in this art. For example, instead of N-ethoxycarbonyl-N'-alkyl thioureas and N-phenoxycarbonyl-N'-alkyl thioureas, other hydrocarboxycarbonyl thioureas of the above formula may be used as the sulfide collector herein, such as N-cyclohexoxycarbonyl-N'-alkyl thiourea, N-(3-butene)-1-oxycarbonyl-N'-alkyl thiourea, N-alkoxycarbonyl-N'-aryl thioureas and N-aryloxycarbonyl-N'-aryl thiourea, to name but a few. Moreover, as been mentioned above, the process may be practiced using as the collector component mixtures of two or more of the hydrocarboxycarbonyl thioureas, as well as mixtures of at least one hydrocarboxycarbonyl thiourea collector in combination with another known collector which may be selected from, for example (a) xanthates or xanthate esters, e.g.

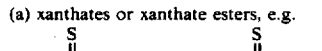

respectively;

(b) dithiophosphates, e.g.

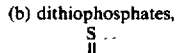

respectively;

(c) thionocarbamates, e.g.

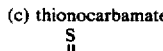

(d) dithiocarbamates e.g.

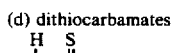

respectively;

(e) trithiocarbonates and derivatives thereof, e.g.

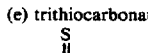

respectively; and (f) dithiophosphinates, e.g.

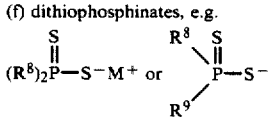

respectively;

(g) mercaptans, e.g.,
$R^{10}SH$;

wherein in each of (a)–(f) above $R^8$ is $C_1$–$C_6$ alkyl and $R^9$ is $C_1$–$C_6$ alkyl, aryl or benzyl, $R^8$ may or may not be equal to $R^9$, and in (g), $R^{10}$ is $C_1$–$C_{12}$ alkyl.

In place of copper mineral values, the process of the present invention may be used to beneficiate other sulfide mineral and metal values from sulfide ores, including, for example, lead, zinc, nickel, cobalt, molybdenum, iron, as well as precious metals such as gold, silver, platinum, palladium, rhodium, irridium, ruthenium, and osminum. All such obvious modifications or changes may be made herein by those skilled in this art, without departing from the scope and spirit of the present invention as defined by the appended claims.

What is claimed is:

1. A collector composition for froth flotation of base metal sulfide minerals comprising at least one hydrocarboxycarbonyl thiourea compound selected from compounds having the formula:

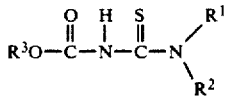

wherein $R^1$ is hydrogen [or $R^2$], $R^2$ is a saturated or unsaturated alkyl radical; and $R^3$ is a saturated or unsaturated alkyl radical.

2. A collector composition as defined in claim 1 wherein [$R^1$ is hydrogen,] $R^2$ is $C_1$–$C_8$ alkyl and $R^3$ is $C_1$–$C_6$ alkyl.

3. A collector composition as defined in claim 1 wherein [$R^1$ is hydrogen,] $R^2$ is isopropyl, and $R^3$ is ethyl.

4. A collector composition as defined in claim 1, wherein [$R^1$ is hydrogen,] $R^2$ is N-butyl, and $R^3$ is ethyl.

5. A collector composition as defined in claim 1 wherein [$R^1$ is hydrogen,] $R^2$ is isobutyl, and $R^3$ is ethyl.

6. A collector composition as defined in claim 1, comprising a liquid mixture of the compound of the formula wherein [$R^1$ is hydrogen,] $R^2$ is isopropyl, and $R^3$ is ethyl and the compound of the formula wherein $R^1$ is hydrogen, $R^2$ is isobutyl and $R^3$ is ethyl in an aliphatic or aromatic hydrocarbon solvent.

7. A collector composition as defined in claim 6, wherein said hydrocarbon solvent is n-octane.

8. In a froth flotation process for beneficiating an ore containing sulfide minerals comprising slurrying liberation-sized particles of said ore in an aqueous medium, conditioning said slurry with effective amounts of a frothing agent and a metal collector, respectively, and frothing the desired sulfide minerals by froth flotation methods, the improvement comprising: employing, as the metal collector, at least one hydrocarboxycarbonyl thiourea compound having the formula:

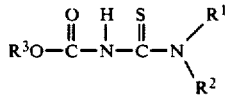

wherein $R^1$ is hydrogen or $R^2$; $R^2$ is a saturated or unsaturated alkyl radical; and $R^3$ is a saturated or unsaturated alkyl radical.

9. A process as recited in claim 8, wherein said metal collector comprises a liquid mixture of the compound of the formula wherein $R^1$ is hydrogen, $R^2$ is isopropyl and $R^3$ is ethyl and the compound of the formula wherein $R^1$ is hydrogen, $R^2$ is isobutyl and $R^3$ is ethyl in a hydrocarbon solvent.

10. A process as recited in claim 8, wherein said aqueous slurry of liberation-sized ore particles has a pH value of from about 3.5 to about 11.0, inclusive.

11. A process as recited in claim 8, wherein in said metal collector $R^1$ is hydrogen, $R^2$ is $C_1$-$C_8$ alkyl and $R^3$ is $C_1$-$C_6$ alkyl.

12. A process as recited in claim 8, wherein in said metal collector, $R^1$ is hydrogen, $R^2$ is isopropyl and $R^3$ is ethyl.

13. A process as recited in claim 8, wherein in said metal collector $R^1$ is hydrogen, $R^2$ is butyl and $R^3$ is ethyl.

14. A process as recited in claim 8, wherein said metal collector is added in an amount of from about 0.005 to about 0.5 lb/T of ore.

15. A process as recited in claim 14, wherein in said metal collector $R^1$ is hydrogen, $R^2$ is isobutyl and $R^3$ is ethyl.

* * * * *